E. RICE.
Tape Holder.
No. 201,835. Patented March 26, 1878.
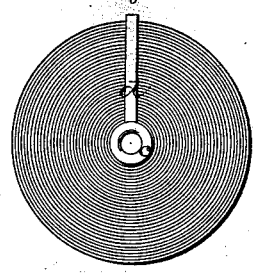
Fig. 1.
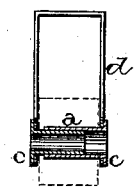  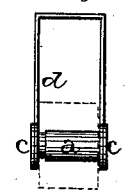
Fig. 2.   Fig. 3.   Fig. 4.
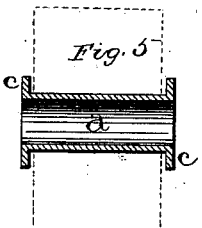
Fig. 5.
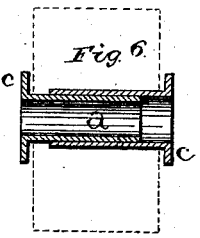
Fig. 6.
WITNESSES
Wm Garner
Will H. Kern
INVENTOR
E. Rice,
per
F. A. Lehmann,
Atty

UNITED STATES PATENT OFFICE.

ELIAKIM RICE, OF CAZENOVIA, NEW YORK.

IMPROVEMENT IN TAPE-HOLDERS.

Specification forming part of Letters Patent No. 201,835, dated March 26, 1878; application filed December 21, 1877.

*To all whom it may concern:*

Be it known that I, ELIAKIM RICE, of Cazenovia, in the county of Madison and State of New York, have invented certain new and useful Improvements in Tape-Holders; and I do hereby declare the following to be a full, clear, and exact description of the invention, such as will enable others skilled in the art to which it pertains to make and use it, reference being had to the accompanying drawings, which form part of this specification.

My invention relates to an improvement in tape-holders; and it consists in a small metallic spool and a guard, which is attached thereto in such a manner that the braid can be wound upon the spool while the guard is in position, as will be more fully described hereinafter.

The accompanying drawings represent my invention.

$a$ represents a small metallic spool, made of sheet metal, and having flanges $c$ turned up at each end. This spool is made in either one or two parts. When made of two parts, one of them fits upon the other, as shown, and before these two parts are fastened together the tape-guard $d$, made of either a wire or a flat strip of metal, is slipped over them, inside of the flanges, as shown. When made of one piece, the flanges are turned up after the guard has been slipped over its ends.

As thus constructed, the spool and guard are practically made in one piece, though the spool can revolve freely without moving the guard, and the guard can swing freely around upon the spool without moving it. By means of this construction the tape can be wound upon the spool while the guard is in position, instead of first having to wind the tape upon the spool, and then secure the guard in position.

Another great advantage is, that the guard and spool cannot become separated, and there is no danger of either of them ever being lost. Not only is the attachment of the two together a great convenience, but the workmen who fill the spools are enabled to place the spool upon the spindle or arbor while the guard is in position, and thus they are enabled to work much more rapidly than where they are separate and distinct, and the guard is to be applied afterward.

I am aware that a tape or ribbon holder applied to spools is, broadly, not new; but in all such cases as known to me the tape-holder has been inserted in the central bore of the spool, or such bore stopped up, so that in no case could the holder be applied until after the spool has been wound. With my invention the holder is applied to the spool before it is wound, and the central bore left entirely free and open.

Having thus described my invention, I claim—

The combination of the metallic spool $a$, having a circumferential flange, $c$, at each end, and the bent metal guard $d$, forming eyes at its ends to fit loosely over the spool inside of the end flanges, leaving the center bore of the spool perfectly free, substantially as herein set forth.

In testimony that I claim the foregoing I have hereunto set my hand and seal this 14th day of December, 1877.

ELIAKIM RICE. [L. S.]

Witnesses:
W. DELOS WELLS,
E. P. MORE.